US006721450B2

(12) United States Patent
Tannenbaum et al.

(10) Patent No.: US 6,721,450 B2
(45) Date of Patent: Apr. 13, 2004

(54) CURVATURE BASED SYSTEM FOR THE SEGMENTATION AND ANALYSIS OF IMAGE DATA

(76) Inventors: Allen Robert Tannenbaum, 6616 Southdale Rd., Edina, MN (US) 55435; Anthony Joseph Yezzi, Jr., 1220 Dunkirk La., Plymouth, MN (US) 55444

(*) Notice: Subject to any disclaimer, the term of this patent is extended or adjusted under 35 U.S.C. 154(b) by 0 days.

(21) Appl. No.: 10/357,974

(22) Filed: Feb. 4, 2003

(65) Prior Publication Data

US 2003/0142868 A1 Jul. 31, 2003

Related U.S. Application Data

(62) Division of application No. 09/293,481, filed on Apr. 15, 1999, now Pat. No. 6,535,623.

(51) Int. Cl.$^7$ .................................................. G06K 9/34
(52) U.S. Cl. ...................................... 382/173; 382/199
(58) Field of Search ........................ 382/100, 128–134, 382/173, 199, 266, 190, 312, 315; 600/410, 425, 450, 479; 378/91

(56) References Cited

U.S. PATENT DOCUMENTS

| | | | | |
|---|---|---|---|---|
| 4,882,679 A | * | 11/1989 | Tuy et al. .................... 600/425 |
| 4,961,425 A | * | 10/1990 | Kennedy et al. ............. 600/425 |
| 5,003,979 A | * | 4/1991 | Merickel et al. ............. 600/410 |
| 5,107,838 A | * | 4/1992 | Yamaguchi .................. 600/410 |
| 5,277,761 A | * | 1/1994 | Van Phan et al. ........... 162/109 |
| 5,343,390 A | * | 8/1994 | Doi et al. ..................... 382/132 |
| 5,360,006 A | * | 11/1994 | Geiser et al. ................ 600/425 |
| 5,361,763 A | * | 11/1994 | Kao et al. .................... 600/410 |
| 5,410,250 A | * | 4/1995 | Brown ......................... 324/309 |
| 5,570,430 A | * | 10/1996 | Sheehan et al. ............. 382/128 |
| 5,601,084 A | * | 2/1997 | Sheehan et al. ............. 600/450 |
| 5,605,155 A | * | 2/1997 | Chalana et al. ............. 600/443 |
| 5,669,382 A | * | 9/1997 | Curwen et al. .............. 600/425 |
| 5,669,799 A | * | 9/1997 | Moseneder et al. .......... 442/374 |
| 5,699,799 A | | 12/1997 | Xu et al. ................... 128/653.2 |
| 5,701,897 A | * | 12/1997 | Sano ............................ 600/453 |
| 5,779,641 A | * | 7/1998 | Hatfield et al. .............. 600/443 |
| 5,795,296 A | * | 8/1998 | Pathak et al. ................ 600/443 |
| 5,800,355 A | * | 9/1998 | Hasegawa .................... 600/436 |
| 5,818,231 A | * | 10/1998 | Smith .......................... 324/309 |
| 5,846,200 A | * | 12/1998 | Schwartz ..................... 600/443 |
| 5,920,319 A | * | 7/1999 | Vining et al. ................ 345/420 |
| 5,923,770 A | * | 7/1999 | O'Donnell et al. .......... 382/131 |
| 6,358,208 B1 | * | 3/2002 | Lang et al. .................. 600/438 |

OTHER PUBLICATIONS

Satyanad Kichenassamy, Peter Olver, Arun Kumar, Allen Tannenbaum and Anthony Yezzi; "Gradient Flows and Geometric Active Countour Models".

Allen Tannenbaum; "Three Snippets of Curve Evolution Theory in Computer Vision"; Mathematical and Computer Modelling Journal 24 (1996) pp. 103–119.

Benjamin Kimia, Allen Tannenbaum, Steven W. Zucker; "On Optimal Control Methods in Computer Vision and Image Processing"; Nov. 24, 1998.

* cited by examiner

Primary Examiner—Jayanti K. Patel
(74) Attorney, Agent, or Firm—Fletcher Yoder

(57) ABSTRACT

A technique for analyzing images for a feature of interest includes generating gradients for a characteristic of an image, such as pixel intensity value, initiating a candidate boundary, and evolving the candidate boundary to the feature boundary. The gradients may be calculated at the outset and referred to through iterative steps in expansion of the candidate boundary to improve the computational efficiency of the processing. The candidate boundary is evolved, either inwardly or outwardly, by reference to mean curvature-weighted normals, resulting in very rapid convergence on the feature. The evolution naturally stops at the feature. The gradients may be diffused or smoothed to improve tolerance to artifacts and noise, while preserving original image definition and resolution. In a cardiac application, the endocardial and myocardial boundaries are analyzed and used to generate composite images, calculate ejection fractions and so forth. The technique is also applicable to other static and dynamic structures and tissues.

25 Claims, 7 Drawing Sheets

CURVATURE BASED SYSTEM FOR THE SEGMENTATION AND ANALYSIS OF IMAGE DATA

This application is a Divisional of application Ser. No. 09/293,481, filed Apr. 15, 1999 now U.S. Pat. No. 6,535,623.

FIELD OF THE INVENTION

The present invention relates generally to the field of imaging, and image processing and analysis techniques, such as those used in medical diagnostics and other fields. More particularly, the invention relates to a technique for rapidly segmenting and identifying features of interest in discrete pixel images and processing data extracted from the images following identification of the features.

BACKGROUND OF THE INVENTION

A great number of applications have arisen in recent years employing discrete pixel images of various types. In general, such images are comprised of an array of picture elements organized in rows and columns of an image matrix. Each element in the matrix may be characterized by various parameters, such as intensity, color, shade, and so forth. These characteristics are most often associated with or defined by information expressed in digital terms and stored in data files defining the image. By organizing and displaying the matrix of picture elements with reference to the parameters, a recognizable and useful reconstructed image may be obtained. The resulting image is typically displayed on a computer monitor or printed on a tangible medium such as paper or photographic film.

A number of modalities are known for acquiring discrete pixel images, particularly in the medical diagnostics field. For example, magnetic resonance imaging (MRI) systems have been developed which permit high-quality images of anatomies of interest in a subject. Such systems make use of controllable magnetic fields which affect precession of gyromagnetic material within the subject. By exciting the gyromagnetic material in the presence of specific fields, the materials can be made to emit signals which are captured and processed. The signals can be transformed to identify the particular intensity of the emissions at specific locations within the subject. By further processing the digitized signals corresponding to these intensities, image data is obtained which can be analyzed, stored, transmitted, and further processed to create a reconstructed image. Other modalities in the medical diagnostics field include computed tomography (CT) systems, digital x-ray systems, positron emission tomography (PET) systems, ultrasound systems, and so forth. In modem systems of all of these types, data sets may be obtained directly, or indirectly, which define features of interest within a subject patient for image reconstruction and processing.

Many applications exist for analysis of identifiable structures within discrete pixel images. In conventional images, the features are typically recognizable by contrasts, outlines, expected shapes, and other somewhat intuitive boundaries or characteristics recognizable to the experienced viewer. Depending upon the image quality, a qualified viewer may identify these features and even take measurements of the structures. However, conventional techniques for manually doing so are quite cumbersome, time-consuming, and imprecise. In the medical diagnostics field, for example, measurements of internal anatomies such as structures of the heart, brain, and other organs and tissues, have conventionally been made by hand or through software requiring substantial user interaction. Due to the drawbacks of these techniques, however, attempts have been made to automate the process.

Techniques which have been advanced for automating feature identification and measurement are not entirely satisfactory. A key aspect of this is the "segmentation problem" which refers to the identification of homogeneous regions in a given image, defined by a set of edges or boundaries. Processes have been developed that use mathematical constructs to deform candidate boundaries to correspond to the limits of a feature of interest. Such deformable boundaries are sometimes referred to as "snakes." However, the methods employed for segmentation based upon these techniques are particularly susceptible to error due to noise present in the image data. Such noise, which may be visible as bright or dark spots or regions on the reconstructed image, may cause the candidate boundary to stop its expansion or contraction before reaching the limits of the feature, or may cause other anomalies in the result. While such noise may be eliminated or reduced by smoothing and other filtering techniques, these also tend to reduce the resolution of the feature of interest, thereby reducing the likelihood that the snake will converge accurately on the feature.

Another serious drawback of heretofore known techniques for automatic segmentation via snakes is the extremely demanding computational requirements involved. In particular, known techniques adopt algorithms which require sequential calculation of a very large number of parameters as the boundary expands or contracts towards the feature of interest. As a result, to be carried out in a reasonable amount of time, very sophisticated and powerful computers are required, particularly for noisy images, and those including a large number of picture elements.

Further drawbacks in existing techniques for automatic segmentation are rooted in the particular algorithms used to generate the candidate boundary and to deform the boundary toward the feature of interest. In particular, the algorithms typically include mechanisms for converging and stopping the evolution of the candidate boundary. Depending upon the techniques employed, the boundary may not fully conform to the feature of interest, particularly where the feature includes concavities and similar contours. Also, where adjacent features are present, the boundaries may not recognize distinctions between the adjacent features and, again, fail to conform accurately to the feature of interest. In either case, the resulting analysis is unreliable due to the failure to accurately recognize the boundary (and hence the surface area, volume or other parameter) of the feature of interest.

There is a need, therefore, for an improved technique for performing segmentation on discrete pixel images. There is, at present, an increasing need for a technique which will permit such segmentation on a series of images, such as images acquired over a three-dimensional space or over time, or both. Such techniques would be particularly useful in analyzing moving tissues, such as those of the heart. The technique would also find useful applications in still structures such as the brain, and so forth.

SUMMARY OF THE INVENTION

The present invention provides a technique for segmenting features of interest in discrete pixel images designed to respond to these needs. The technique makes use of a computationally efficient algorithm for initiating and expanding or contracting a candidate boundary for the feature. In accordance with certain aspects of the technique, a candidate boundary or snake is initialized and evolved by reference to mean curvature-weighted normals. Gradients of intensities within the image may be calculated before this evolution to greatly simplify the computational demands during the evolution. The candidate boundary thus converges extremely rapidly toward the feature and stops upon reaching the feature. The technique is particularly robust and tolerant of noise within the image. However, a diffused or smooth gradients may be used during the evolution to improve the tolerance to noise.

The technique may be used to segment both static and dynamic (or changing) structures. In both cases, the approach may be applied to a series of data sets representing individual images or slices of a subject. Over space, the technique may thus be used to reconstruct a three-dimensional representation of the feature. Over time, the technique may be used to analyze changes in the feature.

In a presently preferred implementation, the segmentation technique is used to measure and analyze features of the heart, such as the endocardium and the myocardium. By time analysis of this information, important characteristics of the heart may be evaluated, such as the ejection fraction. In other structures, both two-dimensional and three-dimensional, and time dependent or independent measurements may be made.

DETAILED DESCRIPTION OF THE INVENTION

Figure 1:
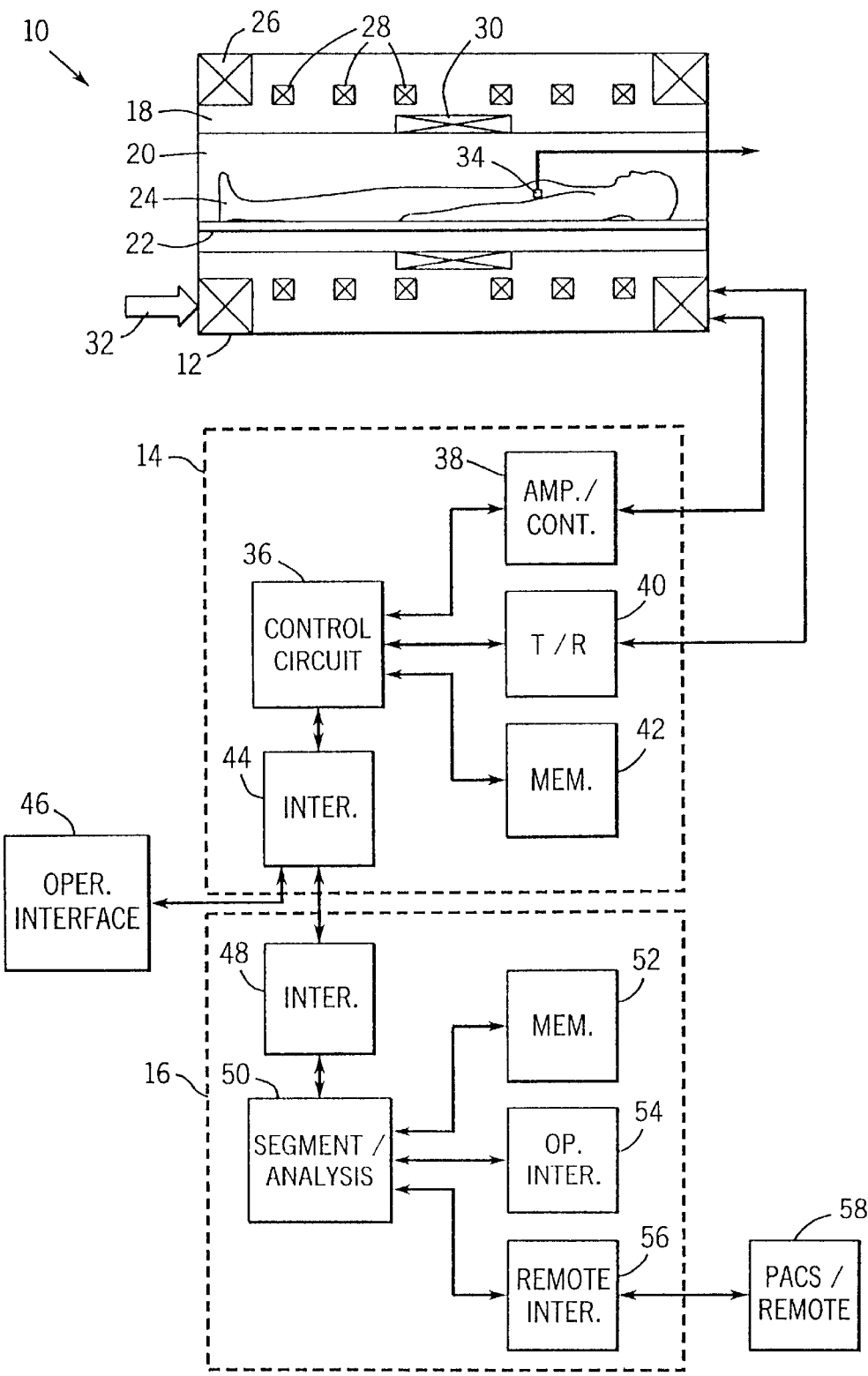
FIG. 1 is a diagrammatical representation of an imaging system for acquiring image data and for performing segmentation and analysis on acquired data in accordance with certain aspects of the present technique.

Turning now to the drawings, and referring first to FIG. 1, an imaging and image analysis system 10 is illustrated diagrammatically as including a scanner 12, scanner control circuitry 14, and system control circuitry 16. It should be noted that while system 10 is based upon a magnetic resonance imaging (MRI) data acquisition modality in the illustrated and described embodiment, the segmentation technique provided herein is not limited to any particular acquisition modality. Accordingly, the technique may be applied to image data acquired through computed tomography systems, positron emission tomography systems, ultrasound systems, x-ray systems, photographic systems, and so forth. Moreover, while the segmentation and analysis functions may be performed in system control circuitry 16 in the illustrated embodiment, such analysis may be performed in remote or stand-alone computers, including work stations, conventional commercial computers, laptop computers, and so forth, either directly connected to the data acquisition circuitry or remote from the data acquisition circuitry. Accordingly, the segmentation and analysis functions may be performed based on archived image data stored or transferred via networks, and the like.

In system 10, as illustrated in FIG. 1, scanner 12 has a housing 18 in which a patient bore 20 is formed. Table 22 is positionable within patient bore 20 for supporting a patient 24 to be imaged. While specific systems may include larger or smaller bores, in the illustrated embodiment, scanner 12 is a full-body scanner in which a patient may be fully positioned.

Within housing 18, scanner 12 includes a primary coil 26 which generates a highly uniform magnetic field generally aligned with the patient. A series of gradient coils 28 are provided for generating controlled, pulsed magnetic fields in accordance with pre-established imaging protocols. A radio frequency coil 30 is provided for generating radio frequency pulses used to excite gyromagnetic material within the patient. In the illustrated embodiment, coil 30 also serves as a receiving coil. Thus, coil 30 may be coupled with driving and receiving circuitry in passive and active modes for receiving emissions from the gyromagnetic material and for outputting radio frequency excitation pulses, respectively. Alternatively, various configurations of receiving coils may be provided separate from coil 30, such as coils specifically adapted for target anatomies.

The coils of scanner 12 are controlled by external circuitry for generating the desired magnetic fields and radio frequency pulses in accordance with the desired imaging protocol. Thus, a power source 32 is coupled to the scanner to supply power for generation of the desired fields and signals. In addition, one of more sensors may be provided for triggering the beginning or the end of a desired imaging sequence. For example, as illustrated in FIG. 1, a cardiac monitor 34 may be provided for sensing heart beats of the patient which are used to trigger the beginning of an acquisition sequence in which a series of images are acquired through at least one cardiac cycle.

The scanner control circuitry 14 includes functional components designed to interface with the scanner, to control the pulse sequences implemented for the data acquisition, and to receive and process image data. Thus, as illustrated in FIG. 1, scanner control circuitry 14 includes a control circuit 36 which commands operation of the scanner through the intermediary of an amplifier/control circuit 38 and a transmit/receive control circuit 40. Amplifier/control circuit 38 is coupled to gradient coils 28 to supply control signals which define pulsed field gradients produced by the coils during an examination sequence. Transmit/receive circuit 40 includes amplification circuitry for producing the radio frequency signals via coil 30, and for switching to passive modes for receiving detected emission signals from the gyromagnetic material. These signals are applied to control circuit 36 which may perform signal processing, filtration, scaling, and similar functions. Memory circuitry 42 is provided for storing configuration parameters, pulse sequence descriptions, and so forth. These are applied to or accessed by control circuit 36 during particular examination sequences. Interface circuitry 44 is coupled to control circuit 36 to permit the scanner control circuitry 14 to receive configuration and examination commands from system control circuitry 16 or directly from an operator interface 46, such as an operator station, work station, and so forth. Interface circuitry 44 also serves to transmit raw or processed image data from scanner control circuitry 14 to system control circuitry 16.

System control circuitry 16 includes various functional circuitry which may be based in a general purpose or application-specific computer or work station. As will be appreciated by those skilled in the art, such stations will include a central processing unit (CPU) or signal processor designed to execute programming code. Interface circuitry 48, which may be at least partially defined by such code, permits commands to be transmitted from the system control circuitry to scanner control circuitry 14, and to receive raw or processed image data back from the scanner. Among the functions executed by the system control circuitry 16, segmentation and analysis functions, as described below, are performed by a segmentation and analysis module 50. Module 50, which may also be at least partially defined by programming code executed by the control circuitry serves to analyze raw or processed image data to identify features of interest from the data and to process the data to evaluate the size, configuration, and other parameters of the particular features of interest. Parameters required for execution of the code implemented by control circuitry 16 are stored in a memory circuit 52. Memory circuit 52 may include various types of solid state or dynamic memory, such as random access memory, tape drives, optical storage devices, and so forth. An operator interface 54 is provided in circuitry 16 and is coupled to the segmentation and analysis module 50 for commanding and controlling the segmentation and analysis functions performed. A remote interface 56 may be provided to permit configuration and image data to be exchanged between circuitry 16 and remote stations, such as picture archive and communication systems as indicated at reference numeral 58. Moreover, systems 58 may include teleradiology stations to which image data is transferred. Each such remote station may include its own segmentation and analysis modules for performing the functions described below on image data.

As will be appreciated by those skilled in the art, when the present technique is employed in systems other than MRI diagnostic systems, the particular circuitry involved will be adapted accordingly. For example, in x-ray, computed tomography or ultrasound systems, data acquisition circuitry will be adapted to acquire image data sets in accordance with the particular physics of those systems. In general, however, the data sets will include a series of values descriptive of pixel characteristics in an image matrix. This image data is analyzed as described below to identify particular features of interest either in an automated or semi-automated fashion.

Figure 2:
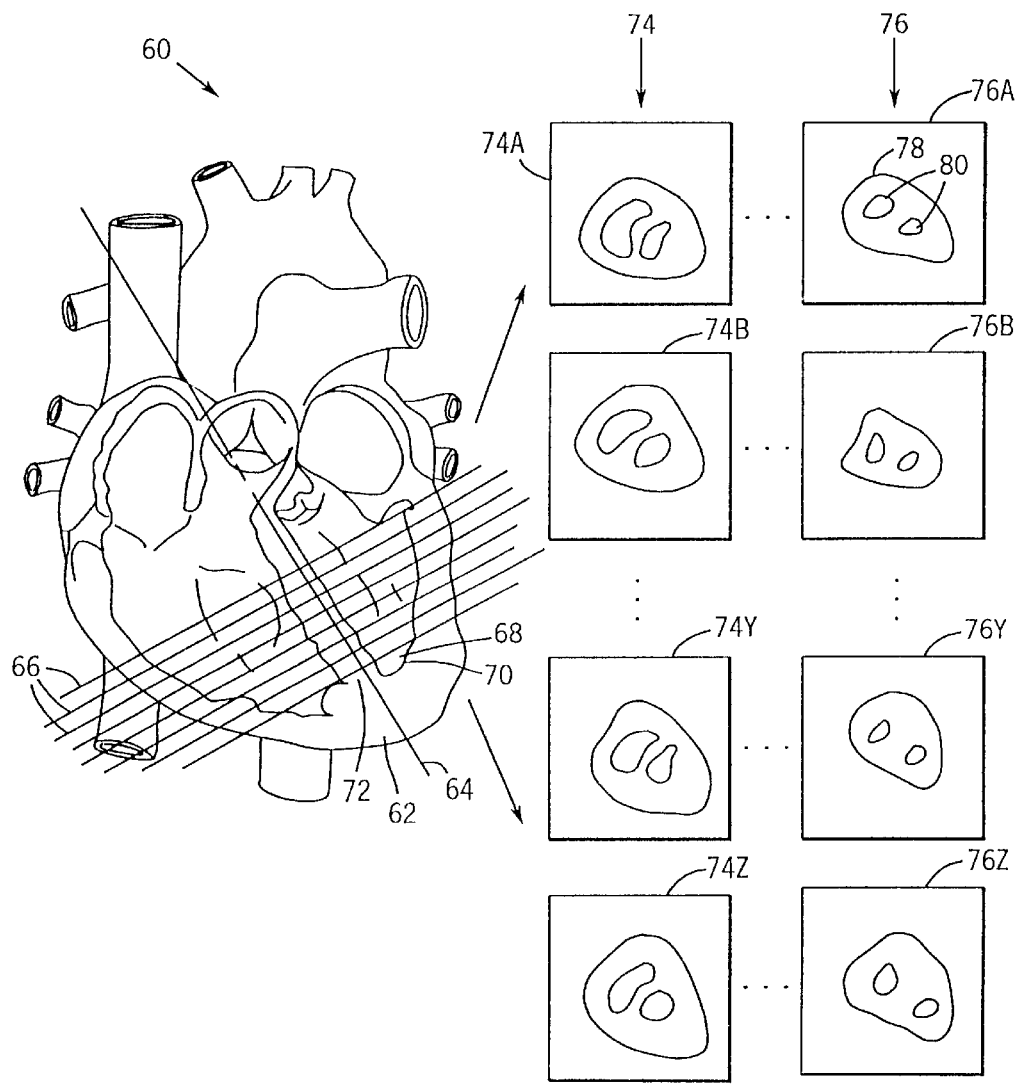
FIG. 2 is a representation of a heart and a series of images produced of the heart through use of a system such as that illustrated in FIG. 1.

The present technique is particularly well suited to analysis of anatomical features of interest. These features may be included in both static and dynamic tissues of a patient, and may be defined in three dimensions as well as in time. FIG. 2 illustrates an exemplary sequence of images formed of a heart via an MRI system such as that illustrated in FIG. 1. As will be appreciated by those skilled in the art, various pulse sequences may be employed for generating selected slice images of such tissues. For example, in the embodiment illustrated in FIG. 2, image sets 60 are acquired of features within a heart 62 of a patient. In this embodiment, features of interest include the boundaries of the left ventricle which are used to generate measurements of particular interest such as the ejection fraction, volume at various stages of the cardiac cycle, and so forth.

The particular features measured in this exemplary process are the endocardium and the myocardium. To permit these features to be imaged and measured through the technique described below, a series of images are acquired in the image set 60 in a short axis view of the heart. In these views, the magnetic fields generated by gradients coils 28 are physically oriented to produce a gradient system aligned along an axis 64 perpendicular to which a series of image slices 66 are oriented. The left ventricle 68 of the heart appears in each image generated along these slices. The endocardium 70 is visible in these images as is the myocardium 72, each having boundaries which vary over the sequence of images along axis 64, as well as over the cardiac cycle as the heart shape and configuration change. Thus, the image data includes data defining a series of images 74 for each point in time through the cardiac cycle. Each time sequence of images includes a series of images 74A, 74B, . . . , 74Y, and 74Z corresponding to the individual slices 66 in the acquired image set. At various points in the cardiac cycle, then, similar slice images are acquired to define subsequent image sequences 76, each comprising a series of slice images 76A, 76B, . . . , 76Y, and 76Z similar to those of set 74. In each of the images, the outline 78 of the heart is visible by contrast between pixels defining the image. Features 80 of interest, such as the left and right ventricles, are also visible in the image data and are subsequently identified as described below.

It should be noted that the particular orientation, composition, number and sequence of images may be adapted for any desired feature of interest. In particular, in a presently preferred configuration, images acquired for a cardiac cycle comprise 14 separate slices along axis 64 and 20 successive imaging times. The resulting image set 60 thus includes 280 images, each defined by a unique matrix of pixel data. Similarly, the matrix size may be adapted for any suitable dimensions or resolution. In the illustrated embodiment, images made up of 256×256 pixels are employed.

The present technique is based upon a mathematical construct in which one or more candidate boundaries are established in an image data set and evolved (i.e. expanded, contracted or conformed) toward a feature of interest. The feature may be defined by any one of a variety of characteristics, such as pixel intensity values. The characteristic used to define the feature provide a transition which sufficiently identifies the feature to permit the evolving boundary to rapidly converge on and stop at the feature. Subsequent data processing can then be performed based upon the configuration of the evolved boundary, such as by determining the number of pixels within the boundary, the boundary length, and so forth.

Figure 3:
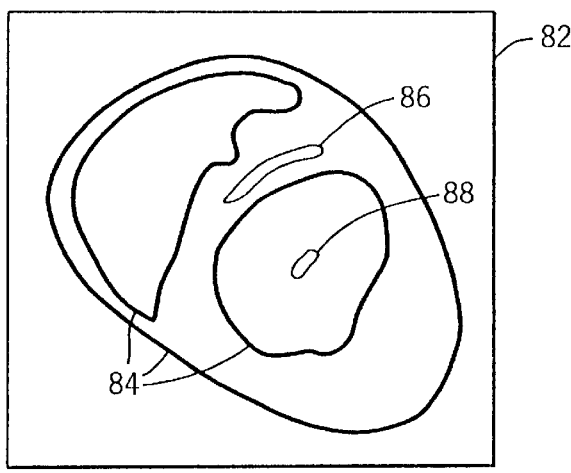
FIG. 3 is a single discrete pixel image of the heart produced as illustrated in FIG. 2, illustrating the initialization of a pair of candidate boundaries for endocardium and myocardium structures.
Figure 4:
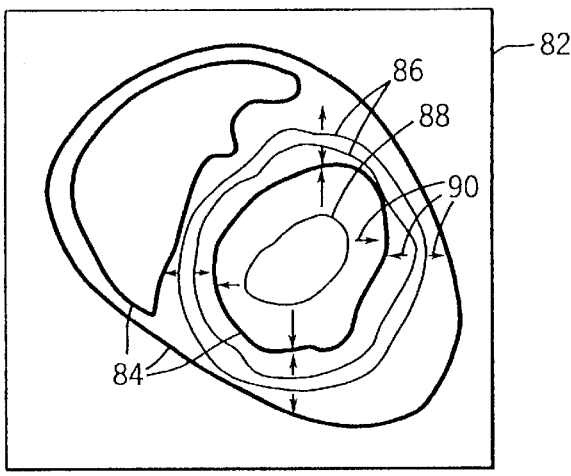
FIG. 4 is an image of the heart as shown in FIG. 3 following partial expansion and contraction of the candidate boundaries initialized in FIG. 3.
Figure 5:
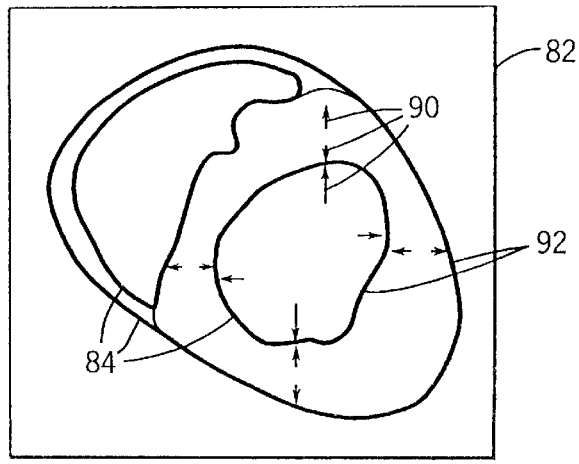
FIG. 5 is an image of the heart as shown in FIG. 3 following full expansion and contraction of the candidate boundaries to the relevant features of interest.

FIGS. 3, 4 and 5 illustrate the initiation and evolution of a set of candidate boundaries for identifying endocardium and myocardium boundaries in a cardiac image of the type illustrated in FIG. 2. As shown in FIG. 3, any one of the images in the image set may be employed for evolution of a candidate boundary to identify the features of interest. In the exemplary image 82 shown in FIG. 3, a series of tissue boundaries 84 appear, some or all of which define volumes of particular interest. As will be appreciated by those skilled in the art, the particular location of these boundaries is often less clear than illustrated in the Figures, represented by greater or lesser degrees of contrast between adjacent pixels in an image matrix. Moreover, various other features which are not of interest, some of which may include image artifacts, may be included in the image. The present technique permits the evolution of candidate boundaries to locate the boundaries of the features of interest with relatively high tolerance to such image artifacts and noise.

As illustrated in FIG. 3, the process, described in greater detail below, begins with initiation of one or more candidate boundaries or snakes as shown at reference numeral 86 for a candidate myocardium boundary and at reference numeral 88 for a candidate endocardium boundary. As shown in FIG. 4, through the present technique, the candidate boundaries are evolved in the direction of the features of interest as indicated by arrows 90. In particular, the candidate myocardium boundary is expanded toward the limits of the myocardium, both inwardly and outwardly, while the candidate endocardium boundary 88 is expanded towards the interior limits of the left ventricle. As shown in FIG. 5, following full evolution of the candidate boundaries, the limits of the features of interest are identified and further evolution of the candidate boundaries stops.

As will be appreciated by those skilled in the art, the present technique is based upon the grouping of parts of an image into units which are homogeneous with respect to one or more features. The candidate boundary, which may also be referred to as an active contour, is permitted to evolve, once initiated, under the influence of image-dependent factors, and certain parameters which may be set by the user. In the present technique, for example, rapid evolution is provided by computation of mean curvatures and mean curvature-weighted normals as described below, in the discrete domain. Moreover, the computations involved in the evolution may be greatly simplified by a single computation of gradients prior to the evolution of the candidate boundary. Where desired, additional tolerance to noise is provided by smoothing or diffusion of these gradients. However, the original image is not smoothed, but rather, the gradient direction along which the candidate boundary is evolved is diffused, preserving original image features and resolution.

The continuous domain implementation of the technique will now be described, followed by a description of the discrete domain implementation. The technique is based upon identification of a characteristic, denoted herein "$\phi$" which is an image-based function considered to be small for the feature of interest. For example, $\phi$ may represent intensity values or the inverse of intensity values for individual pixels, depending upon the nature of the image data and its intended presentation. The feature, which is identifiable in any one of a series of spatially and temporally defined images, as illustrated in FIG. 2, is identified by reference to the relationship (eq. 1):

$$\frac{\partial S}{\partial t} = \phi f(H)N + g(\phi, \nabla \phi)$$

where $S(x_1, \ldots, x_n, t)$ is the evolving candidate boundary, $\partial S/\partial t$ represents the partial derivative of S with respect to t, $\phi$ is a stopping term defined below, H represents a mean curvature of the moving surface, N is the unit normal, and f and g are functions which arise from the minimization of an energy functional derived from weighted length, area and volume. It should be noted that equation 1 is valid in any number of space and time dimensions. In the present embodiment, four dimensions may be employed, including three space dimensions and a time dimension. Alternatively, two-dimensional implementations may be employed in which only length and width spatial dimensions are used, and with or without an additional time dimension.

As a first step in the analysis, $\phi$ is defined to be a positive image-dependent function which is small near the boundary of the feature of interest. In this implementation, the function $\phi(x_1, \ldots, x_n)$ is employed as a stopping term in the evolution of the candidate boundary. For example, the term $\phi(x_1, \ldots, x_n)$ may be chosen to be small near an edge, and acts to stop the evolution of the candidate boundary when the contour approaches or overlies the edge. In this case, the definition of $\phi$ may be expressed (eq.2):

$$\phi := \frac{1}{1 + \|\nabla G_\sigma * I\|^2}$$

where I is the n-dimensional gray-scale image and $G_\sigma$ is a Gaussian (smoothing) filter. In general for two vectors $a=(a_1, \ldots, a_n)$ and $b=(b_1, \ldots, b_n)$, we set $<a, b>=a \cdot b = a_1 b_1 + a_2 b_2 + \ldots + a_n b_n$, and $\|a\| = \sqrt{<a, a>}$. This stopping term is designed to find intensity-based edges. Others may be formulated for textures and for various features in color imagery as well. The evolution of the candidate boundary is considered to progress through a flow in which the boundary of the feature of interest resides at the bottom of a potential well. The value of the boundary may be expressed (eq. 3):

$$\frac{\partial S}{\partial t} = \phi(H + \varepsilon)N + (1/nS \cdot \nabla \phi - \nabla \phi \cdot N)N$$

where $S(x_1, \ldots, x_n, t)$, H, N, and $\phi$ have the values defined above, and $\epsilon$ is a binary metric threshold constant, and $\nabla$ is a gradient term of the value $\phi$ in the directions of the coordinate system of the image. Here, H is the mean curvature which is the sum of the principal curvatures, and N is the inward unit normal. The direction of evolution of the candidate boundary can be controlled by the parameter $\epsilon$. As will be appreciated by those skilled in the art, this expression has the interpretation of balancing the volume and surface area minimizing forces, so that the edge in n-dimensions is regarded as a minimal surface/volume in an appropriate conformal geometry. To enhance the tolerance of the technique to image artifacts and other image noise, a diffused gradient $\nabla \phi$ may be used as described below.

In implementing the technique based upon equation 3, the equation is suitably discretized on a triangulated surface so as to move the vertices of the candidate boundary to decrease the energy of which equation 3 is Euler-Lagrange derivative at each step. This technique entails the computation of the mean curvature, the normal, and the Gaussian curvature (which informs the method of the concavity or convexity of the surface at any given point in its evolution).

Figure 6:
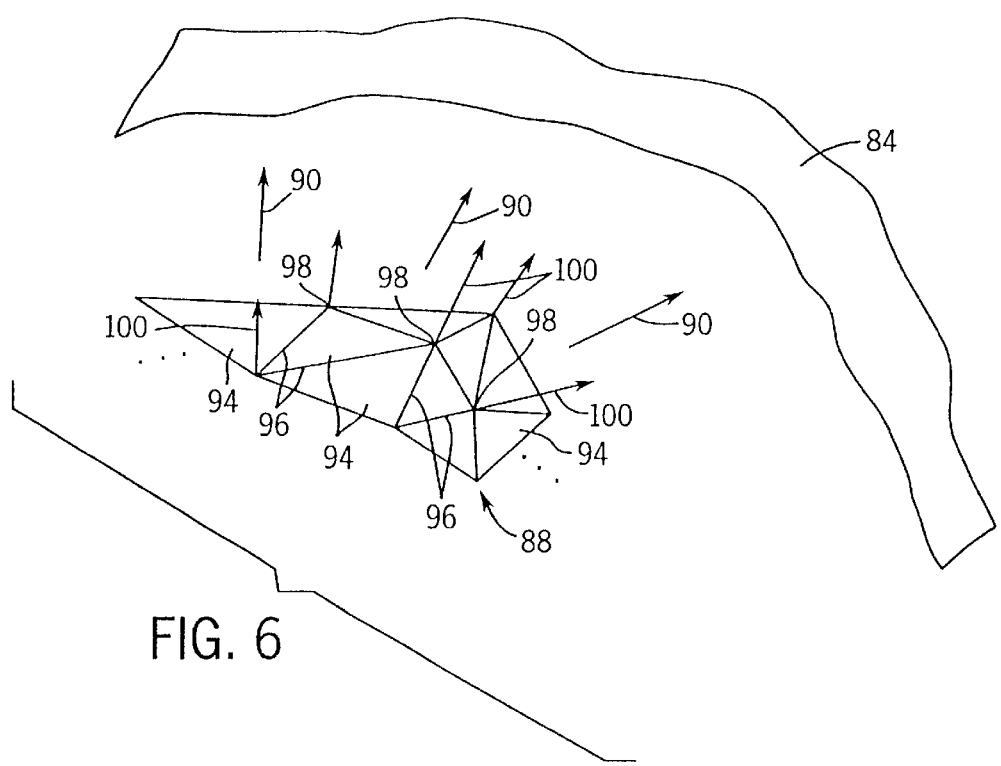
FIG. 6 is a detailed representation of a portion of a candidate boundary expanding toward a feature of interest and converging on the feature of interest in a rapid manner by reference to mean curvature weighted normals.

The triangulated surface employed in the technique is defined by a series of flat surfaces, edges and points as illustrated in FIG. 6. These basic geometric elements are shown in FIG. 6 as adjacent surfaces 94, joined to one another by straight edges 96, the edges meeting in common vertices 98. In the technique, these elements are referred to by identifiers which also contain an orientation for each element. In particular, vertices 98 are points in space, edges 96 are straight line segments joining pairs of vertices, and surfaces 94 are faces of flat triangles bounded by three edges. The surface topology is given by cross-references among the elements. The identifiers may be defined by four byte words, with one of the bits being an orientation bit. In particular, each face-edge is defined in two double-linked lists, one of face-edges around the edge, and another of face-edges around the face. Each edge points to its two end points, and to one face-edge loop around it. Each face points to one face-edge and the face-edge loop around it, and to the two bounding faces on its two sides. As described below, normals 100 extend from each point or vertex 98. Evolution of the candidate boundary 88 follows the mean curvature weighted normals 100 to evolve rapidly towards the boundaries of the feature of interest indicated at reference numeral 84 in FIG. 6.

Assuming a three dimensional implementation of the technique (defining a three dimensional surface), a maximum curvature $k_1$ and a minimal curvature $k_2$ may be computed. The mean curvature H is, then, defined by the relationship (eq. 4):

$$H = k_1 + k_2$$

If S:[0,1] X [0,1]→$R^3$ (R=real numbers) denotes a compact imbedded surface with local coordinates (u, v), the values $S_u$ and $S_v$ may be set as (eq.5A):

$$S_u = \frac{\partial S}{\partial u} \quad \text{(eq. 5B)}$$

and $$S_v = \frac{\partial S}{\partial v}$$

The infinitesimal area on S is then given by the relationship (eq.6):

$$dS = (\|S_u\|^2 \|S_v\|^2 - \langle S_u, S_v \rangle^2)^{1/2} du \, dv$$

It is noted in the present technique that the gradient flow associated with the area functional for such surfaces (ie., the direction in which the area is changing most rapidly) is given by the relationship (eq. 7):

$$\frac{\partial S}{\partial t} = HN$$

Thus, the mean curvature vector HN on a triangulated surface may be determined by taking the direction in which the area is changing most rapidly, and, given the length of this vector, the normal direction can be computed. This technique is employed in the present procedure as a basis for computing the mean curvature on a triangulated surface. In particular, if p is a vertex as described above, and each vertex has a star of faces surrounding it of area $A_p$, the force due to the surface tension on the vertex is given by the relationship (eq. 8):

$$F_p = -\frac{\partial A_p}{\partial p}$$

Because each face has three such vertices, the area associated with p is $A_p/3$. Thus, the (average) mean curvature at v is (eq.9):

$$h_p = \frac{3 F_p}{2 A_p}$$

Moreover, the Gaussian curvature K may be defined as (eq. 10):

$$K = k_1 k_2$$

where the values of $k_1$ and $k_2$ are those described above. This value may be computed at each vertex on a triangulated surface by the relationship (eq. 11):

$$(\Sigma_i \theta_i) - \pi$$

where the sum is taken over the adjacent angles θ to the given vertex. This provides an indication of whether the surface is convex or concave at a given point (convex being defined as a quantity <π, and concave >π).

As noted above, the foregoing technique may be employed with diffused gradients to enhance the tolerance of the technique to image artifacts and noise. While the tolerance to noise may be provided by pre-processing smoothing, this may have the undesired effect or removing salient features, including the definition of the feature of interest. In a presently preferred technique, enhanced tolerance to noise is provided by smoothing or diffusing a gradient term $\nabla \phi$, which represents the actual vector field. In particular, for the desired vector field (eq. 12):

$$v(x_1, \ldots, x_n) = (v_1(x_1, \ldots, x_n), \ldots, v_n(x_1, \ldots, x_n))$$

(representing the desired smooth vector field), $v(x_1, \ldots, x_n)$ may be derived as the minimal energy solution to the variational problem (eq. 13):

$$\int \int 2\alpha \sum_{i=0}^{n} \|\nabla v_i\| + \|\nabla \phi\|^2 \|v - \nabla \phi\|^2 dx_1 \ldots dx_n$$

This minimization problem may be solved by using gradient descent associated Euler-Lagrange equations (eq. 14):

$$\alpha D\left(\frac{v_i}{\|v_i\|}\right) - (v_i - \nabla \phi)\|\nabla \phi\|^2 = 0, \; i = 1, \ldots, n$$

noting that for a function f: $R^n \to R$, the value div f is set in accordance with the relationship defined by (eq. 15):

$$Df = \sum_{i=0}^{n} \frac{\partial f}{\partial x_i}$$

In the relationship defined above, the value α acts as a scale space parameter, the magnitude of which is directly related to the degree of smoothing effect on the gradient vector field. Moreover, the term (eq. 16):

$$D\left(\frac{v_i}{\|v_i\|}\right)$$

defines the mean curvature on the isophotes of $v_i$, that is, on the sets (eq. 17):

$$v_i(x_1, \ldots, x_n) = c$$

for a constant c.

Figure 7:
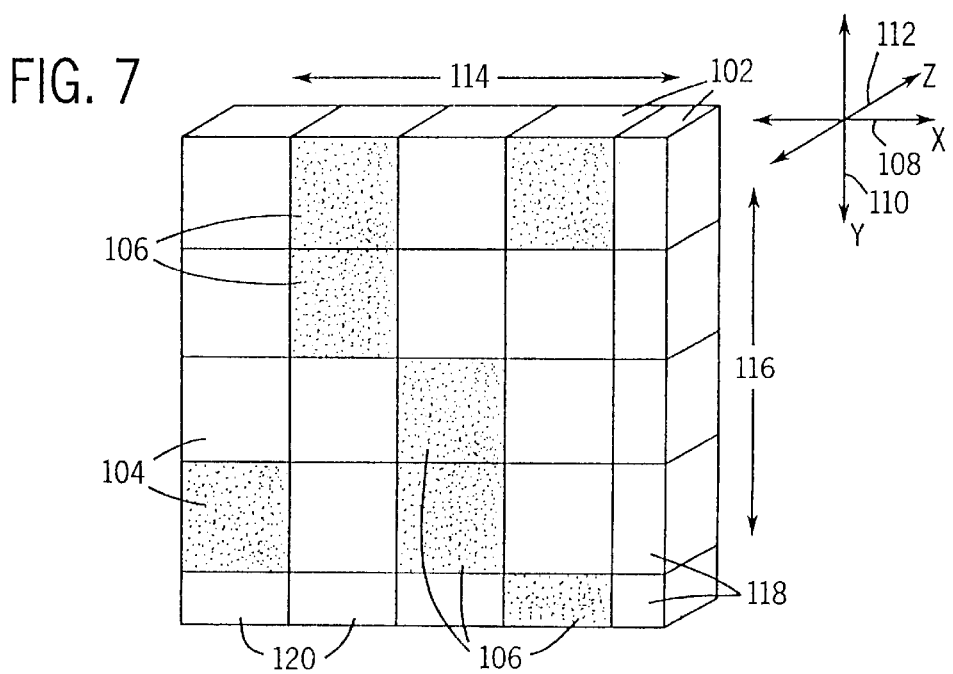
FIG. 7 is an enlarged view of a portion of a discrete pixel image illustrating the portion of the analysis performed for expansion of a candidate boundary in accordance with aspects of the present technique.

The foregoing technique provides a robust and rapid mechanism for evolving a candidate boundary toward a boundary of a feature of interest. To facilitate implementation of the technique with discrete pixel image data, differences between values of image characteristics φ (eg. intensity values) for adjacent pixels (or voxels) are divided by pixel spacing to approximate the derivative of values described above. This technique may be employed in three spatial dimensions for three-dimensional implementation. The same technique may be employed in only two dimensions for two-dimensional implementations as illustrated in FIG. 7. As indicated above, the image is representative of a series of voxels 102 which, in a two-dimensional implementation corresponds to image pixels 104. Characteristics of particular interest in the pixels will define the feature of interest, as indicated at pixels 106 in FIG. 7. In a coordinate system defined by x, y and z axes, 108, 110 and 112, respectively in FIG. 7, the slice may be considered to extend in x and y directions for a constant location along the z direction. In the cardiac implementation described above, a series of such slices are defined by image slices 66, and correspond to each image in the series 74 and 76, as well as in intermediate series. Thus, the image matrix extends in the x direction as indicated at reference numeral 114 in FIG. 7, and in the y direction as indicated at reference numeral 116. Rows 18 and columns 120 of pixels thus define the image.

As mentioned above, intensity differences may be defined by comparing intensities of adjacent pixels in both the x direction 114 and in the y direction 116 in the discrete pixel image data. Similarly, intensity differences over time may be defined by comparing identical locations of image data in different time images (see image series 74 and 76 in FIG. 2), and an approximation of the time differential determined by dividing these differences by the time step between images. By sequential iteration of the computations described above, the candidate boundary automatically converges on and stops at the desired feature boundary or edge. Again, this boundary may be defined as the location where the term φ is small (i.e. minimal). There is generally no need to provide, a priori, a bound on the number of iterations.

For smoothing the gradient, and thereby enhancing the tolerance to image noise, a "time" parameter is added to equation 14 above to define the relationship (eq. 18):

$$\frac{\partial v_i}{\partial t} = \alpha D\left(\frac{v_i}{\|v_i\|}\right) - (v_i - \nabla \phi)\|\nabla \phi\|^2$$

$$i = 1, \ldots, n$$

To simplify the nomenclature, in the discrete embodiment two dimensions in a two-dimensional implementation may be defined as $x=x_1$, and $y=x_2$. The two-dimensional image, such as that illustrated in FIG. 7, is discretized with the grid points placed at the pixel locations. The values Δx and Δy represent the step sizes in the two directions, which in a simplified implementation may be assumed to be equal, such that (eq. 19):

$$\Delta x = \Delta y = h$$

The discretization in a temporal direction is introduced and the time step Δt is used to compute the temporal intensity gradient change at each pixel. These discretizations are then employed to compute gradients at each point (iΔx, jΔy), as follows (eq's 20, 21):

$$\phi_x(i,j) \cong 0.5(I(i+1,j) - I(i-1,j))/\Delta x$$

$$\phi_y(i,j) \cong 0.5(I(i,j+1) - I(i,j-1))/\Delta y$$

In this implementation, the characteristic of interest in the pixels is considered to be a pixel intensity. As noted above, however, other characteristics such as color, and so forth may be employed. It should also be noted that in the foregoing relationships, the base relationship (eq. 22):

$$\phi_x(i,j) = \phi_x(i\Delta x, j\Delta y)$$

is employed, as is a similar base relationship in the y direction.

As a subsequent step in the discretization of the system, the value of $v_1$ is defined as (eq. 23):

$$v_{1i,j,k} = v_1(i\Delta x, j\Delta y, k\Delta t)$$

Based upon this relationship, the shock derivative may be defined as (eq. 24):

$$v_{1i,j,k+1} = v_{1i,j,k} + \frac{\Delta t}{h}\left[\Delta_-^x\left(\frac{\Delta_+^x v_{1i,j,k}}{(\rho_{v_1^x})_{i,j,k}}\right) + \Delta_-^y\left(\frac{\Delta_+^y v_{1i,j,k}}{(\rho_{v_1^y})_{i,j,k}}\right)\right]$$

where (eq. 25):

$$(\rho_{v_i^y})_{i,j,k} = [(\Delta_+^x v_{1i,j,k})^2 + (m(\Delta_+^y v_{1i,j,k}, \Delta_-^y v_{1i,j,k}))^2]^{1/2}$$

and (eq. 26):

$$(\rho_{v_i^x})i,j,k = [(m(\Delta_+^x v_{1i,j,k}, \Delta_-^x v_{1i,j,k}))^2 + (\Delta_+^y v_{1i,j,k})^2]^{1/2}$$

In these relationships, the following definitions are held (eq. 27):

$$\Delta_\mp^x v_{1i,j,k} = \mp(v_{1i\mp i,j,k} - v_{1i,j,k})$$

and (eq. 28):

$$\Delta_\mp^y v_{1i,j,k} = \mp(v_{1i\mp i,j,k} - v_{1i,j,k})$$

Moreover, the function m is defined as (eq. 29):

$$m(a,b) = \left(\frac{sgn(a) + sgn(b)}{2}\right)\min(|a|, |b|)$$

In a preferred implementation, a current Courant-Friedrichs-Lewy (CFL) step size restriction is imposed which may take the following form (eq. 30):

$$\frac{\Delta t}{h^2} \leq c$$

Figure 8:
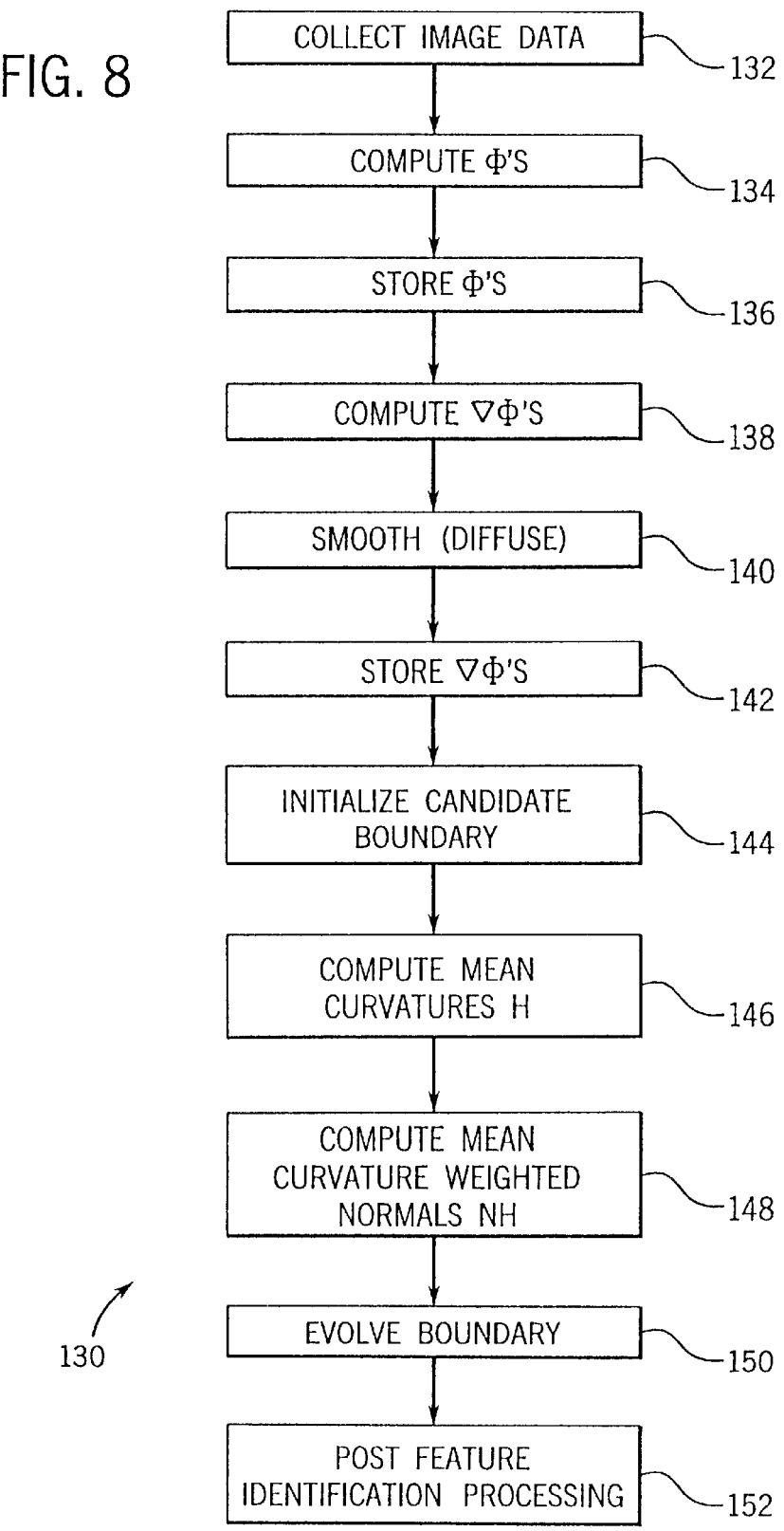
FIG. 8 is a diagram illustrating steps in exemplary control logic for performing a segmentation analysis in accordance with the present technique on a discrete pixel image.

The technique may be expressed as a sequence of logical steps as defined in FIG. 8. These steps are preferably defined by appropriate programming code executed by module 50 (see FIG. 1). In the steps of the sequence, indicated generally by reference numeral 130, image data is first collected as indicated at step 132. Again, this image data may be collected by various means, such as through MRI systems, CT systems, x-ray systems, ultrasound systems, and so forth. The values of interest, φ, as indicated at step 134, are then computed for the image data, for each pixel in the discrete implementation. Again, these values may comprise any suitable image characteristic, typically intensity. For analysis of a series of images, distributed over space and/or time, characteristic values are computed for each of the space and/or time images. As indicated at step 136, these values φ are then stored, such as in the system's digital memory.

At step 138, the gradients of the values φ are computed. As describe above, in the discrete implementation, these gradients are based upon differences between adjacent pixel values divided by the spacing between the pixels. For time gradients, identically located pixels are compared and differences between the pixels are divided by the sample time step. At step 140 the gradients are diffused as described above, and the diffused gradients are stored at step 142. It will be noted by those skilled in the art, that the present technique provides for calculation of the gradients only one time at the initial phase of analysis. Subsequently, evolution of the candidate boundary proceeds without the need to again calculate the gradients, significantly improving the performance and speed of the technique, greatly enhancing the computational efficiency, and reducing the need for sophisticated or expensive processing capabilities.

At step 144 the candidate boundary is initialized. In a presently preferred technique, a user may trace a candidate boundary on an image at a location within a feature of interest for evolution within the feature, outside a feature of interest for evolution from outside inwardly towards the feature, or between various features. Where multiple images are analyzed, a single initialization may be used for the series of images and the initial candidate boundary referenced in the analysis of the other images in the sequence. Alternatively, this boundary initialization may be fully automated as well.

At step 146, the mean curvatures H are computed, and at step 148 the mean curvature-weighted normals HN are computed. In the discrete implementation, steps 146 and 148 are performed inherently through the discretizations summarized in equations 20–30. At step 140 the candidate boundary is evolved through a series of iterative steps which converge on and automatically stop at the feature boundary. At step 152, any post feature identification processing may be performed, such as computation of areas, volumes, and so forth, based upon the final location of the fully evolved boundary.

Figure 9:
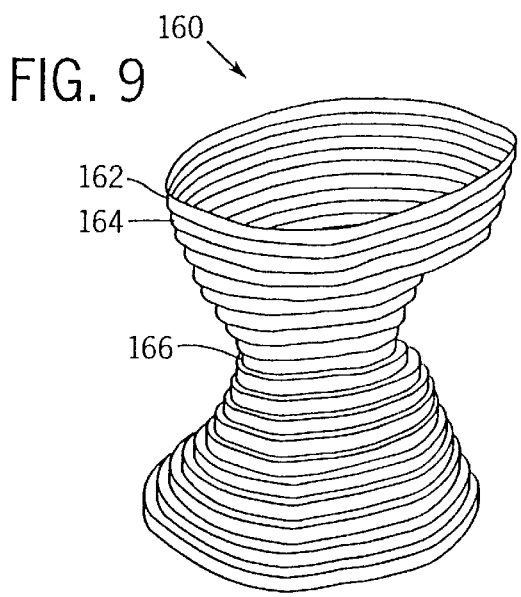
FIG. 9 is a time-based reconstruction of a series of measurements of an endocardium surface in accordance with the present technique for measurement and analysis of parameters of a patient's heart.

Post feature identification processing may take a number of forms, including calculation of scalar and vector quantities, and reconstruction of two and three-dimensional images. Moreover, images may be reconstructed based upon several dimensions, including time. By way of example, FIG. 9 represents reconstruction of a time profile for a specific location or slice of an endocardium, comprising a series of fully evolved boundaries generated in accordance with the foregoing technique. The reconstructed profile, designated generally by the reference numeral 160, thus comprises a first boundary 162 followed by a subsequent boundary 164 which will typically correspond to the same spatial slice in the sequence of cardiac images, but subsequent in time. By reconstructing the profile based on a series of such evolved boundaries, a composite profile 166 may be obtained which provides a graphical representation of the change in configuration of the feature over time. As indicated below, by measuring parameters of the boundary, such as by determining the number of pixels within each evolved boundary, specific measurements and comparisons over time may be obtained. Similar time reconstructions may be generated based upon any feature of interest which can be identified and measured by the foregoing technique, including boundaries of the endocardium, the myocardium, as well as other static and moving boundaries.

Figure 10:
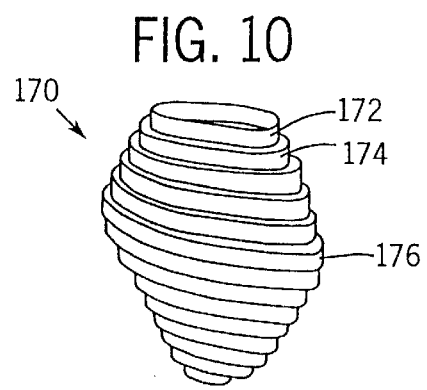
FIG. 10 is a perspective view of a reconstructed three-dimensional feature, such as the left ventricle of a heart, based upon analysis in accordance with the present technique.

FIG. 10 represents a spatial reconstruction 170 based upon a series of fully evolved candidate boundaries from a series of spatially related images. In particular, FIG. 10 represents a three-dimensional profile of a left ventricle defined by a sequence of boundaries 172, 174, and so forth, reconstructed to provide a full three-dimensional profile 176. As will be appreciated by those skilled in the art, the profile permits a composite volume of the feature to be measured by summation of the individual volumes of the evolved boundaries. Such composite images may be presented as time reconstructions as well, to provide simulated two or three-dimensional motion reconstructions offering an intuitive illustration of changes in the feature over time.

Figure 11:
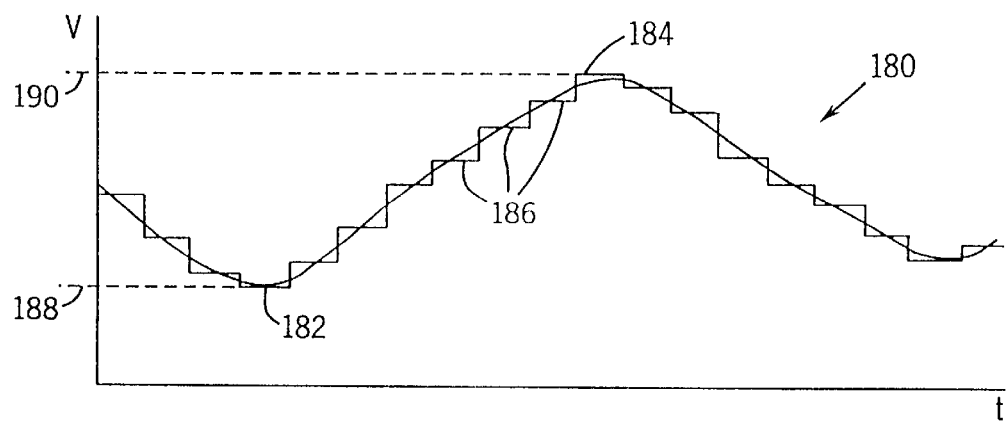
FIG. 11 is a graphical representation of typical post-segmentation analysis which may be performed in accordance with the present technique, such as based upon the time-based reconstruction of FIG. 9.

Further processing may be provided to identify particular parameters of interest both in space, time, or both. FIG. 11 represents a graphical presentation of individual volumes of an endocardium as computed for specific times in a cardiac cycle in accordance with the foregoing technique. The resulting time profile 180 thus represents a change in volume over time, with each volume being calculated by summation of individual slices of the feature as described above. In the example illustrated in FIG. 11, a minimal volume 182 may be identified by analysis of the sequence of resulting volumes. Similarly, a maximum volume 184 may be identified. It should be noted that the volumes may be expressed or illustrated in terms of reconstructed images as shown in FIG. 10, as well as quantities representative of overall or actual volumes measured. Between the minimum and maximum volumes, a series of volume steps 186 are defined for each time frame in which the slice images are generated. By computing the minimum and maximum volumes, as represented at reference numerals 188 and 190, the ejection fraction may be determined as a ratio of these quantities.

Figure 12:
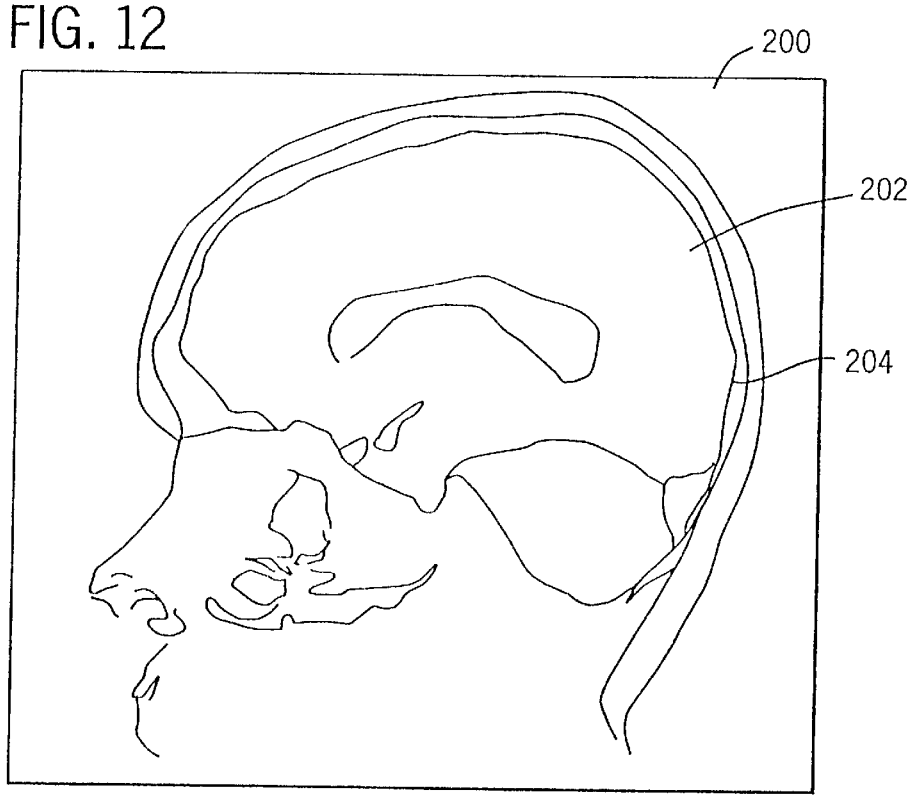
FIG. 12 is a representation of a discrete pixel image of a brain obtained through an imaging system such as an MRT system; and, FIG. 13 is a reconstructed three-dimensional image of the brain illustrated in FIG. 12, following segmentation analysis and reconstruction in accordance with aspects of the present technique.
Figure 13:
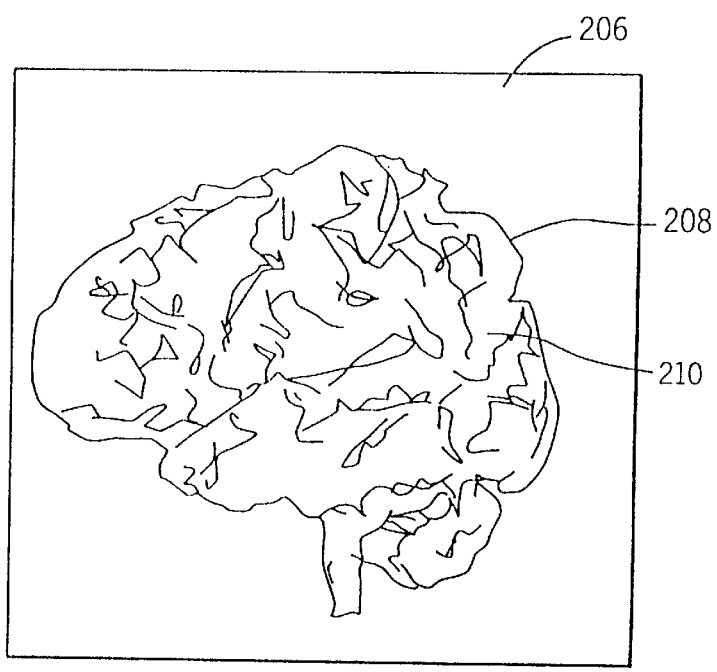

As noted above, the foregoing technique may be employed for identifying and measuring features of interest in any of a variety of contacts. Moreover, the technique is equally applicable to static and dynamic structures or tissues. FIGS. 11 and 12 represent a single reconstructed image of a brain and a subsequent processed reconstruction of the brain as developed from a series of such views. The image 200 is based upon a magnetic resonance image produced in accordance with conventional techniques. The image includes a variety of structures as defined by varying intensity pixels in an image matrix, including brain tissue 202 surrounded by an image boundary 204 identifiable through the foregoing technique. Where such boundaries are identified for a series of related images, series of related images, such as a series of slices produced of the entire brain of a patient, reconstructed images 206 may be produced as described above in the case of cardiac images. In particular, the reconstructed images are defined by a series of external boundaries 208 which, in a composite rendering provide surfaces 210 in three dimensions. Such images may be associated with programming code for rotation, enlargement, reproduction, measurement, and so forth.

While the invention may be susceptible to various modifications and alternative forms, specific embodiments have been shown in the drawings and have been described in detail herein by way of example only. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A method for segmentation of a discrete pixel image, the image being defined by data representative of characteristics of a plurality of pixels of an image matrix, the method comprising the steps of:
   computing gradients for an image characteristic;
   storing the gradients;
   initializing a candidate boundary; and
   evolving the candidate boundary to a boundary of a feature of interest based upon the gradients and mean curvature weighted normals for the candidate boundary.

2. The method of claim 1, wherein the image characteristic is representative of intensity.

3. The method of claim 1, wherein the step of computing the gradients is performed once, and the step of evolving the candidate boundary is performed through a plurality of iterations based upon the gradients.

4. The method of claim 1, wherein the gradients are diffused prior to evolution of the candidate boundary.

5. The method of claim 1, wherein the steps are performed for a plurality of related images to identify portions of a feature of interest in at least three dimensions.

6. The method of claim 5, wherein the at least three dimensions includes time.

7. The method of claim 5, comprising the further steps of measuring at least one quantity in the plurality of images, and deriving a parameter of interest from the measured quantities.

8. The method of claim 7, wherein the parameter of interest is volume.

9. The method of claim 7, wherein the parameter of interest is an ejection fraction of a heart.

10. The method of claim 5, comprising the further step of reconstructing a composite image based upon fully evolved candidate boundaries within at least two of the plurality of images.

11. An imaging and segmentation system comprising:
    an image data acquisition unit, the unit generating image data of a subject including a feature of interest;
    a control circuit coupled to the image data acquisition unit and configured to command acquisition of the image data;
    a memory circuit for storing the image data; and
    a segmentation and analysis circuit comprising means for identifying the feature of interest, means for initiating a candidate boundary, and means for evolving the candidate boundary to a boundary of the feature of interest based upon one or more gradients and upon the mean curvature weighted normals for the candidate boundary.

12. The system of claim 11 wherein the image data acquisition unit is configured to generate a series of image data sets and the segmentation and analysis circuit is configured to identify the feature of interest in each of the series of images.

13. The system of claim 12 wherein the segmentation and analysis circuit is configured to generate a composite image based upon the feature as identified in the series of image data sets.

14. The system of claim 12 wherein at least two of the data sets in the series of image data sets are representative of images taken at different times.

15. The system of claim 12 wherein at least two of the data sets in the series of image data sets are representative of images taken at substantially the same time and spatially offset from one another.

16. A tangible medium for segmentation of a discrete pixel image, the image being defined by data representative of characteristics of a plurality of pixels of an image matrix, the tangible medium comprising:
    a routine for computing gradients for an image characteristic;
    a routine for storing the gradients;
    a routine for initializing a candidate boundary; and
    a routine for evolving the candidate boundary to a boundary of a feature of interest based upon the gradients and mean curvature weighted normals for the candidate boundary.

17. The tangible medium of claim 16 wherein the image characteristic is representative of intensity.

18. The tangible medium of claim 16 wherein the routine for computing the gradients is performed once, and the routine for evolving the candidate boundary is performed through a plurality of iterations based upon the gradients.

19. The tangible medium of claim 16, wherein the gradients are diffused prior to evolution of the candidate boundary.

20. The tangible medium of claim 16 wherein the routines are executed for a plurality of related images to identify portions of a feature of interest in at least three dimensions.

21. The tangible medium of claim 20 wherein the at least three dimensions includes time.

22. The tangible medium of claim 20 comprising a routine for measuring at least one quantity in the plurality of images, and a routine for deriving a parameter of interest from the measured quantities.

23. The tangible medium of claim 22 wherein the parameter of interest is volume.

24. The tangible medium of claim 22, wherein the parameter of interest is an ejection fraction of a heart.

25. The tangible medium of claim 20 comprising a routine for reconstructing a composite image based upon fully evolved candidate boundaries within at least two of the plurality of images.

* * * * *